Dec. 29, 1931.  R. J. BEUTEL ET AL  1,838,132
CIGAR FEEDING HOPPER
Filed April 14, 1928   3 Sheets-Sheet 1

INVENTOR
Robert J. Beutel
Vigga F. Splied
BY Sydney J. Prescott
ATTORNEY

Dec. 29, 1931. R. J. BEUTEL ET AL 1,838,132
CIGAR FEEDING HOPPER
Filed April 14, 1928 3 Sheets-Sheet 2
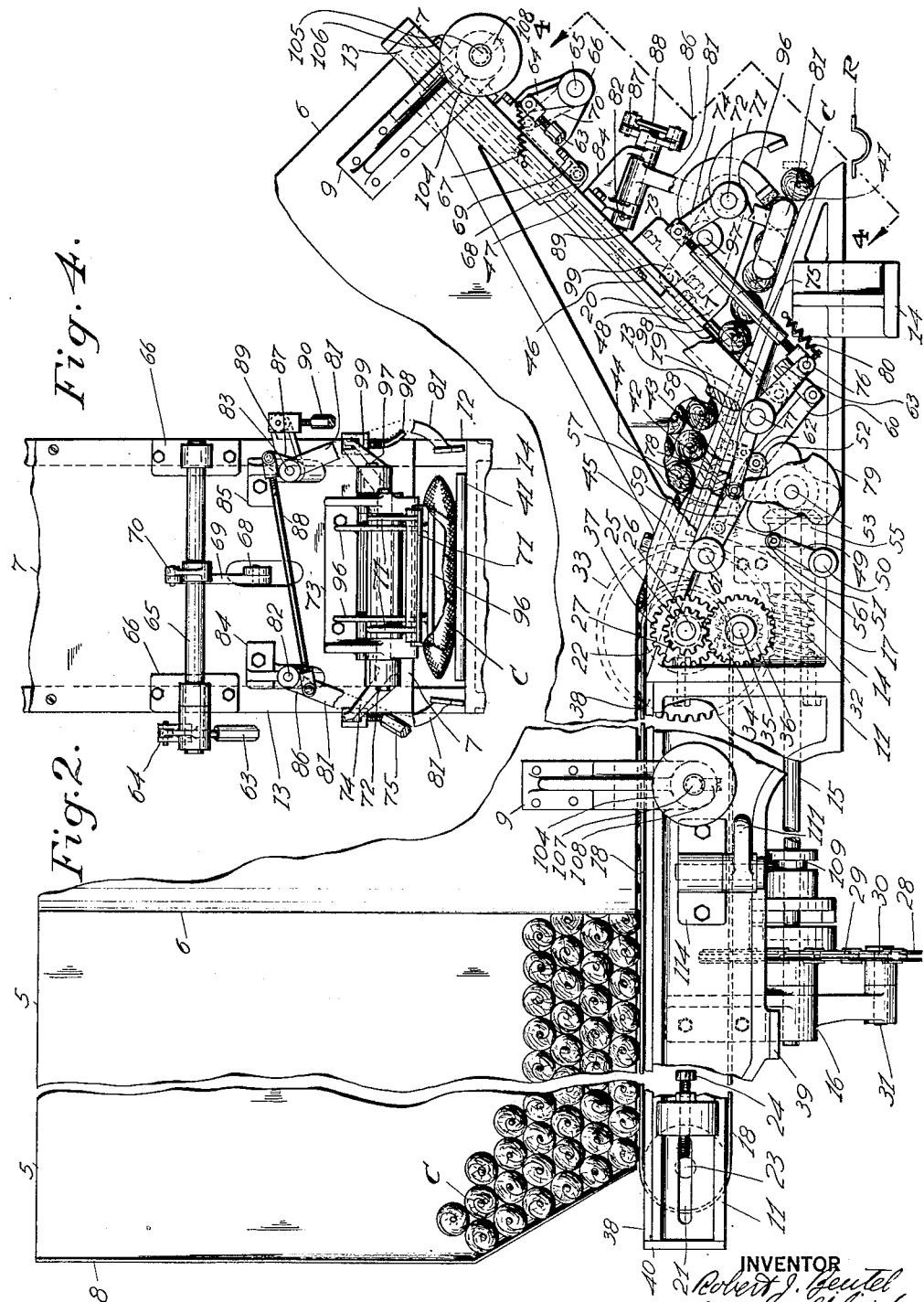

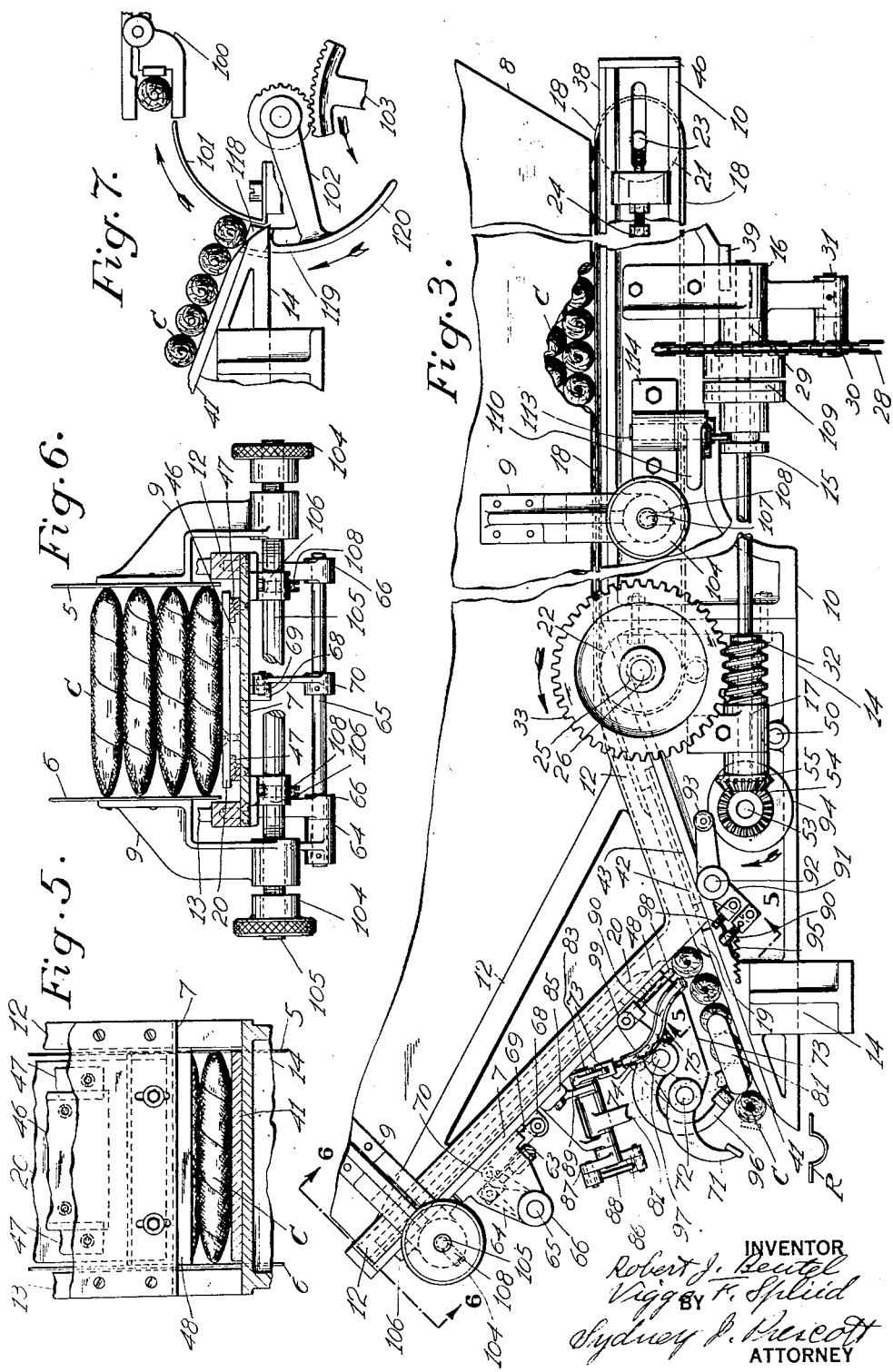

Patented Dec. 29, 1931

1,838,132

UNITED STATES PATENT OFFICE

ROBERT J. BEUTEL AND VIGGO F. SPLIID, OF BROOKLYN, NEW YORK, ASSIGNORS TO AMERICAN MACHINE & FOUNDRY COMPANY, A CORPORATION OF NEW JERSEY

CIGAR FEEDING HOPPER

Application filed April 14, 1928. Serial No. 270,111.

This invention relates to hoppers for feeding cigars, cigarettes, or similar articles, one at a time, into a wrapping, banding, sorting, or other machine such for example as that disclosed in a copending application Serial No. 203,082, filed July 2, 1927, its main object being to accomplish this feeding rapidly without damage to the articles fed.

Another object is to provide such a devcice having a hopper of large capacity, thus dispensing with an attendant, except at infrequent intervals. Another object is to provide means for feeding the cigars, cigarettes or other articles from bulk in such a hopper without jamming or sticking, despite the considerable mass above the delivery point. Still another object is to provide means for stopping the articles as they are delivered from the hopper, and releasing said articles in proper position to be received by transfer means for transferring the articles to the machine, such as that disclosed in the above mentioned copending application, operating on the article.
The present device consists of a continuously advancing feed belt and of two reciprocating hopper plates placed within a receptacle or hopper. Through the relative movement of the belt and the plates, the articles are caused to roll out of the hopper onto an inclined surface, on which they are arrested by suitable stop-arms, and are released one by one at proper intervals, to be received by a conveyor chain or other transfer means, which forms part of the machine to which the articles are to be fed and which transports them to the proper part of that machine.

In the accompanying drawings:
Fig. 1 is a top view of the improved hopper partly broken away;

Figs. 2 and 3 are side elevations of the same partly broken away;

Fig. 4 is an end elevation as seen from line 4—4 of Fig. 2;

Fig. 5 is a sectional view taken on line 5—5 of Fig. 3;

Fig. 6 is a fragmentary detail view taken on the line 6—6 of Fig. 3; and Fig. 7 is a fragmental side elevation showing a modification of the cigar delivery and transfer means.

Figure 1:
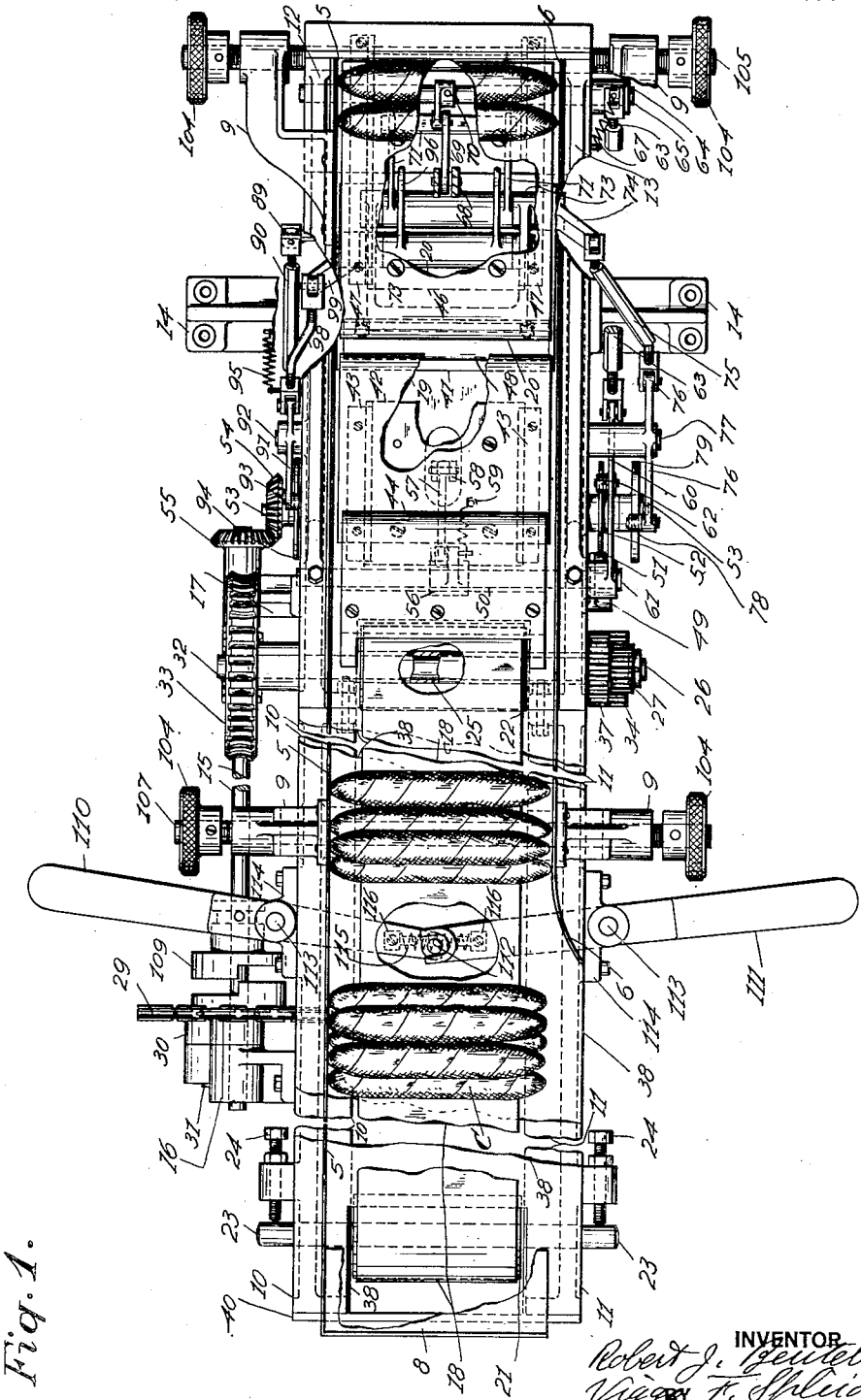

In carrying the invention into effect, there is provided a hopper having an opening near its bottom, which opening is of a size to permit passage therethrough of only one article at a time, and movable means are provided on either side of and inclined toward said opening for supporting a portion of said bulk near the opening, and mechanism is provided to impart movement to said means for feeding the articles through the opening. In the best constructions there are also provided means for forwarding the rest of the bulk in the hopper onto said means. In the best constructions also the movable means includes movable plates, together with mechanism operating to reciprocate the plates. In the best constructions contemplated, an inclined way is provided leading from the hopper and mechanism is included for feeding a single row of articles from the hopper onto the way for gravitation along the same, stop and release means also being provided for first releasing the foremost article on the way for movement off the way while stopping the following article and then releasing the said following article and stopping it in the position vacated by said foremost article.

Referring to Figs. 1 to 4, the device consists of a hopper having side walls 5 and 6, a front wall 7 and a rear wall 8, supported by a main frame. This main frame comprises a triangular frame 14 secured by projecting lugs to the machine to which the device is intended to feed the articles, or to a common support with such machine, and said frame has an inclined upper surface to which are secured two bracket shaped side members 12 and 13. Secured to the vertical end of the frame 14 is a pair of side frames 10 and 11, which serve to support the bottom of the hopper. The two side walls 5 and 6 are adjustably supported on the side frames 10 and 11 by brackets 9, which brackets are secured to the side walls and are carried by rods 105 threaded to said brackets and secured in bearings 106 fastened to the side frames. Located in bearings 16 and 17 attached to the frames 10 and 14, is the main drive shaft 15, from which the feed belt and reciprocating plates are driven.

The main portion of the bulk of the cigars C in the hopper rest on the slowly moving belt 18, which runs over pulleys 21 and 22. A pulley 21 is loosely mounted on a shaft 23, which is supported in slots of frames 10 and 11, and can be adjusted by screws 24 for tightening the belt. A pulley 22 is keyed to a hollow shaft 25, which turns on a shaft 26 located in the frame 14, having a spur gear 27 mounted on it. The shaft 15 is driven by means of a chain 28 running over a sprocket 29 on the shaft 15 and an idler 30 on a stud 31 held in a bracket 16, and said shaft has secured to it a worm 32 which operates a worm gear 33 on a shaft 26. A spur gear 27 on the shaft 26 drives a gear 34 on a shaft 35, the gear 34 being attached to the spur gear 36, in mesh with a spur gear 37 fixedly mounted on the hollow shaft 25, thereby operating the belt drive to slowly move the belt. The belt 18 is supported by a plate 38 resting on side frames 10 and 11, which are held together by the connecting bars 39 and 40.

To insure feeding from the hopper in proper relation to the operation of the machine to which the cigars are fed, the chain 28 will ordinarily be driven from a drive shaft of said machine.

The cigars are fed out of the hopper through an opening formed by mounting the front wall 7 of the hopper on the under sides of frames 12 and 13, with the lower end edge of the wall spaced above the plate 41 sufficiently to let one cigar at a time pass out of the hopper. A plate 48 adjustably attached to wall 7 to overhang said lower end edge (see Fig. 5), permits adjustment of the opening for different sizes of cigars. The cigars as they roll out of the opening in a single row, roll down an inclined way formed by a plate 41 secured on the upper inclined surface of the frame 14.

To insure movement of the cigars through the opening and to prevent jamming or sticking of the cigars, two slidably mounted inclined plates 19 and 20, supporting a portion of the cigar bulk on either side of the opening, are provided.

The reciprocating plate 19 is mounted on the slide 42, guided by the gibs 43 attached to frame 14, and partly overlaps plate 41 which supports the lower edge of the plate 19. The upper end of the reciprocating plate 19 is covered by the stationary plate 44 attached to block 45 of frame 14. This plate serves to protect the cigars from the butt of said plate.

Reciprocating plate 20 partly overlaps the plate 48 and is secured on a slide 46 sliding in gibs 47, attached to front wall 7 inside of the hopper. The reciprocating motion of plates 19 and 20 agitates the cigars resting on the plates and causes the cigars to move towards the hopper outlet.

The plate 19 is reciprocated by a cam lever 49 mounted on a shaft 50, and having a roller 51 in engagement with a cam 52 on a shaft 53. The latter shaft is located in frame 14 and has secured thereto a bevel gear 54 which is driven by a bevel gear 55 on shaft 15. On the shaft 50 is also mounted a lever 56, which, by means of a rod 57, is connected with a block 58 attached to the under side of plate 19 and projecting through a slot provided for the purpose in the inclined upper surface of frame 14. A spring 59, attached to the lever 56 and anchored to the frame 14, maintains contact of the roller 51 on the cam 52.

The reciprocating plate 20 is actuated through slide 46 secured thereto, by a cam lever 60 on a shaft 61 in the frame 14, which has a roller 62 in engagement with the cam 52. The cam lever 60, by means of rod 63, is connected with lever 64 on shaft 65 mounted in bearings 66 attached to the under side of the front-wall 7. A spring 67, attached to the lever 64 and anchored to the side of the frame 13, keeps the roller 62 in contact with the cam 52. The slide 46 fastened on the underside of plate 20, receives its motion through a block 68 mounted on the underside of the slide and projecting through a slot in wall 7, the block 68 being connected by means of a link 69 with a lever 70 on the shaft 65.

The cigars C, which roll out of the hopper onto the inclined plate 41 in a single row, are stopped by oscillating stop arms 71 and 96 the former acting on the foremost cigar on the way and the latter acting on the cigar following the foremost cigar.

The arm 71 is fastened on a shaft 72 which is held in bearings of bracket 73 mounted on the underside of wall 7. A lever 74 on the shaft 72 is connected by means of a rod 75 to a cam lever 76 fulcrumed on a stud 77 and having a roller 78 held in engagement with the circumference of a cam 79 on shaft 53 by the spring 80.

As the arm 71 ascends to release the foremost cigar on the plate 41, allowing it to drop into one of the receptacles "R" provided on the transfer, stop arm 96 lined with a soft resilient material such as sponge-rubber, descends upon the next following cigar "C", thus holding it and preventing it and other cigars from rolling out of the hopper. Then the arm 71 descends into its former position, while the arm 96 is lifted and the article thus released gravitates to the position vacated by the foremost cigar and is there stopped by arm 71. The arm 96 is mounted on shaft 97 held in bearings of brackets 73 and is operated by cam lever 91, which, by means of the rod 98, is connected with lever 99 on shaft 97.

A pair of swingable guide plates 81 extending along either side of the row of cigars (see Fig. 4), mounted on shafts 82 and 83, held in brackets 84 and 85 attached to the underside of wall 7, keep the ejected cigars, which are resting on plate 41, in a central position and in alignment by tapping on the ends of the cigars with the flat faces of the guides. Shafts 82 and 83 have fixed levers 86 and 87, connected by the rod 88. The lever 89, mounted on shaft 83, is connected by the rod 90 with the cam lever 91 on stud 92, cam lever 91 having the roller 93 in engagement with the circumference of cam 94 on shaft 53. The spring 95, fastened to cam lever 91 and anchored to frame 14, keeps roller 93 on cam 94.

In Fig. 2, the receptacles "R", into which the cigars "C" are delivered by the hopper, are parts of a conveyor chain, not shown, which forms a part of the machine for wrapping or otherwise acting on the cigar, and this conveyor passes below the hopper delivery mouth, each receptacle receiving a cigar delivered on it as it arrives in the position shown.

In the modification shown in Fig. 7, the cigars from the hopper are fed into receptacles having their openings arranged to receive cigars fed in a horizontal direction, such as the horizontal pockets 100 of the turret of the machine disclosed in the above mentioned copending application. In this form the cigars descending from the hopper are allowed to roll against an arcuate stationary guide wall 101, the upper edge of which is in alignment. A pivoted arm 102 is oscillated by a gear segment 103, or other suitable means, so that an arc shaped head 119 thereon passes along the arcuate wall. A cigar engaging surface 118 on the upper end of the arc shaped head, on oscillation of the arm, serves to push the foremost cigar on the inclined plate 41 along the arcuate wall into the turret pocket. An arcuate surface 120 on the arc shaped element trailing the surface 118, serves to stop the following cigar while the foremost cigar is being transferred and to release the same when the cigar engaging surface 118 is returned to cigar receiving position, as shown in Fig. 7. In this form of the device the stop-arms 71 and 96, together with their actuating mechanism, are not required and may be omitted.

The adjustment of the side walls 5 and 6, for different lengths of cigars, is effected by means of knobs 104, which are fastened to the rods 105 carried by the bearings 106 attached to the wall 7 and to the rods 107 located in bearings provided in frames 10 and 11. The rods 105 and 107 are held in position by set-screws 108, Fig. 6, projecting from the bearings into annular grooves cut into the shafts. When turning the knobs 104, the right and left handedly threaded ends of the rods 105 and 107, which are threaded in brackets 9 secured to walls 5 and 6, move both brackets of the same shaft simultaneously in opposite directions to separate or bring together the walls.

The driving shaft 15 can be stopped by disengaging its slidably mounted clutch 109 from the loosely mounted sprocket 29. For convenience the clutch 109 is operable from either side of the machine by levers 110 and 111, the former lever having the pin 112 in engagement with a slot in the latter lever, the levers 110 and 111 being fulcrumed on studs 113 in brackets 114 attached to the sides of frames 10 and 11. As may be seen from Fig. 1, the spring 115, attached to blocks 116 of levers 110 and 111, will retain the levers in either their clutch engaging or clutch disengaging position.

What is claimed is:

1. In a device for feeding articles one by one from bulk to a machine operating on the articles, the combination of a hopper having an opening near its bottom, said opening being of a size to permit passage therethrough of only one article at a time, and movable plates on either side of and inclined toward said opening for supporting a portion of said bulk near the opening and mechanism imparting limited edgewise movement to said plates to prevent jamming without interrupting passage of the articles through the opening.

2. In a device for feeding articles one by one from bulk to a machine operating on the articles, the combination of a hopper having an opening near its bottom, said opening being of a size to permit passage therethrough of only one article at a time, movable plates on either side of and inclined toward said opening for supporting a portion of said bulk near the opening, and mechanism imparting limited edgewise movement to said plates to prevent jamming without interrupting passage of the articles through the opening, said mechanism operating to agitate said means.

3. In a device for feeding articles one by one from bulk to a machine operating on the articles, the combination of a hopper having an opening near its bottom, said opening being of a size to permit passage therethrough of only one article at a time, movable plates on either side of and inclined toward said opening for supporting a portion of said bulk near the opening and mechanism imparting limited edgewise movement to said plates to prevent jamming without interrupting passage of the articles through the opening, and means for forwarding the rest of said bulk onto said means.

4. In a device for feeding articles one by one from bulk to a machine operating on the articles, the combination of a hopper having an opening near its bottom, said opening being of a size to permit passage therethrough of only one article at a time, movable plates on either side of and inclined toward said opening for supporting a portion of said bulk near the opening, mechanism imparting limited edgewise movement to said plates to prevent jamming without interrupting passage of the articles through the opening, and a moving belt operative to forward the rest of said bulk onto the said means.

5. In a device for feeding articles one by one from bulk to a machine operating on the articles, the combination of a hopper having an opening near its bottom, said opening being of a size to permit passage therethrough of only one article at a time, and movable plates on either side of and inclined toward said opening for supporting a portion of said bulk near the opening and mechanism imparting limited edgewise movement to said plates to prevent jamming without interrupting passage of the articles through the opening, said mechanism operating to reciprocate the plates.

6. In a device for feeding articles one by one from bulk to a machine operating on the articles, the combination of a hopper having an opening near its bottom, said opening being of a size to permit passage therethrough of only one article at a time, and movable plates on either side of and inclined toward said opening for supporting a portion of said bulk near the opening and mechanism imparting limited edgewise movement to said plates to prevent jamming without interrupting passage of the articles through the opening, the edge of one of said plates projecting into said opening.

7. In a device for feeding articles one by one from bulk to a machine operating on the articles, the combination of a hopper having an opening near its bottom, said opening being of a size to permit passage therethrough of only one article at a time, and movable plates on either side of and inclined toward said opening for supporting a portion of said bulk near the opening and mechanism imparting limited edgewise movement to said plates to prevent jamming without interrupting passage of the articles through the opening, said means reciprocating one of said plates along the direction of feeding and another of said plates transverse to the direction of feeding.

8. In a device for feeding articles one by one from bulk to a machine operating on the articles, the combination of a hopper having an opening near its bottom, said opening being of a size to permit passage therethrough of only one article at a time, movable plates on either side of and inclined toward said opening for supporting a portion of said bulk near the opening and mechanism imparting limited edgewise movement to said plates to prevent jamming without interrupting passage of the articles through the opening, and transfer means for receiving articles fed through said opening and transferring them one by one to said machine.

9. In a device for feeding articles one by one from bulk to a machine operating on the articles, the combination of a hopper having an opening near its bottom, said opening being of a size to permit passage therethrough of only one article at a time, movable plates on either side of and inclined toward said opening for supporting a portion of said bulk near the opening and mechanism imparting limited edgewise movement to said plates to prevent jamming without interrupting passage of the articles through the opening, and an inclined way for receiving the articles as they are fed through said opening for gravitation along the same.

10. In a device for feeding articles one by one from bulk to a machine operating on the articles, the combination of a hopper having an opening near its bottom, said opening being of a size to permit passage therethrough of only one article at a time, movable plates on either side of and inclined toward said opening for supporting a portion of said bulk near the opening, mechanism imparting limited edgewise movement to said plates to prevent jamming without interrupting passage of the articles through the opening, an inclined way for receiving the articles as they are fed through said opening for gravitation along the way and stop and release means operating to first release the foremost article on the way for movement off the way while stopping the following article and then releasing the said following article and stopping it in the position vacated by said foremost article.

11. In a device for feeding articles one by one from bulk to a machine operating on the article, the combination of a hopper having an opening near its bottom, said opening being of a size to permit passage therethrough of only one article at a time, movable plates on either side of and inclined toward said opening for supporting a portion of said bulk near the opening, mechanism imparting limited edgewise movement to said plates to prevent jamming without interrupting passage of the articles through the opening, an inclined way for receiving the articles as they are fed through said opening for gravitation along the way, stop and release means operating to first release the foremost article on the way while stopping the following article and then releasing the said following article and stopping it in the position vacated by said foremost article, and a transfer device arranged to receive the foremost article as it is released and transfer it to the machine.

12. In a device for feeding articles one by one from bulk, the combination of a hopper having downwardly converging bottom and end walls supporting a part of said bulk, an opening in said walls near the point of convergence to permit passage of the articles, plates in engagement with the cigar bulk slidable on each of said walls, and means for causing limited reciprocation of said plates to prevent jamming without interrupting passage of articles through the opening.

13. In a device for feeding articles one by one from a hopper, the combination of an inclined way leading from the hopper, mechanism for feeding a single row of articles from the hopper onto the way, and a device for keeping the articles in predetermined aligned position on the way comprising a plate having a plane surface extending along the side of the row and mechanism for tapping said surface against the articles.

14. In a device for feeding articles one by one from bulk, the combination with a hopper having an opening near its bottom, of movable plates on either side of and inclined toward said opening for supporting a portion of said bulk near the opening, one of said plates passing through said opening and the other falling short of said opening, the opening being of a size to permit passage of only one article at a time past the former plate, and means for reciprocating said plates to prevent jamming without at any time blocking the passage of articles through the opening.

In testimony whereof, we have signed our names to this specification.

ROBERT J. BEUTEL.
VIGGO F. SPLIID.